US010455590B2

(12) United States Patent
Zarifi et al.

(10) Patent No.: US 10,455,590 B2
(45) Date of Patent: Oct. 22, 2019

(54) SYSTEM AND METHOD FOR BOUNDARYLESS SERVICE IN WIRELESS NETWORKS WITH COOPERATIVE TRANSMISSION POINTS

(71) Applicant: Huawei Technologies Co., Ltd., Shenzhen (CN)

(72) Inventors: Keyvan Zarifi, Ottawa (CA); Mohammadhadi Baligh, Ottawa (CA); Jianglei Ma, Ottawa (CA); Amine Maaref, Kanata (CA)

(73) Assignee: Huawei Technologies Co., Ltd., Shenzhen (CN)

( * ) Notice: Subject to any disclaimer, the term of this patent is extended or adjusted under 35 U.S.C. 154(b) by 459 days.

(21) Appl. No.: 13/973,523

(22) Filed: Aug. 22, 2013

(65) Prior Publication Data
US 2015/0057010 A1   Feb. 26, 2015

(51) Int. Cl.
*H04W 72/08* (2009.01)
*H04W 72/12* (2009.01)
(Continued)

(52) U.S. Cl.
CPC .......... *H04W 72/082* (2013.01); *H04B 7/024* (2013.01); *H04B 7/0617* (2013.01); *H04W 72/1231* (2013.01)

(58) Field of Classification Search
CPC ........... H04W 72/082; H04W 72/1278; H04W 72/1231; H04W 72/1226; H04W 72/002; H04L 5/1438
See application file for complete search history.

(56) References Cited

U.S. PATENT DOCUMENTS

2003/0128658 A1* 7/2003 Walton .................. H04L 1/06
                                                              370/208
2010/0041407 A1* 2/2010 Caire .................... H04W 16/28
                                                              455/446
(Continued)

FOREIGN PATENT DOCUMENTS

CN          101931439 A         12/2010
CN          102158962 A          8/2011
(Continued)

OTHER PUBLICATIONS

International Search Report and Written Opinion received in International Application No. PCT/CN2014/084761, dated Nov. 19, 2014, 13 pages.

*Primary Examiner* — Charles N Appiah
*Assistant Examiner* — Xiang Zhang
(74) *Attorney, Agent, or Firm* — Slater Matsil, LLP

(57) ABSTRACT

Embodiments are provided to serve user equipments (UEs) that experience, for example persistently, inter-transmission point group (TPG) interference in a wireless or cellular network. The embodiments include steps to serve edge UEs (EUs) such as persistent EUs (PEUs) using a set of transmission points (TPs) in one or more TPGs. The selected set of TPs used for serving the EUs or PEUs are dynamically determined based on a UE-centric metric. The metric involves the PEUs and surrounding UEs. The UE-centric metric is used to partition the network to multiple TPG sets. For each one of multiple assigned resource units (RUs), a TPG set that maximizes or improves a network-wide utility is used for scheduling transmissions. Further, for each RU, the UEs are associated with an optimized or improved TPG in the used TPG set.

31 Claims, 8 Drawing Sheets

(51) Int. Cl.
*H04B 7/024* (2017.01)
*H04B 7/06* (2006.01)

(56) References Cited

U.S. PATENT DOCUMENTS

| | | | |
|---|---|---|---|
| 2010/0056215 A1* | 3/2010 | Gorokhov | H04B 7/024 |
| | | | 455/561 |
| 2010/0203887 A1 | 8/2010 | Kim | |
| 2012/0207093 A1 | 8/2012 | Li | |
| 2012/0275507 A1 | 11/2012 | Roman et al. | |
| 2012/0307704 A1* | 12/2012 | Roman | H04W 56/004 |
| | | | 370/312 |
| 2012/0322492 A1* | 12/2012 | Koo | H04B 7/0417 |
| | | | 455/517 |
| 2013/0322376 A1* | 12/2013 | Marinier | H04W 72/06 |
| | | | 370/329 |
| 2014/0003268 A1* | 1/2014 | Zarifi | H04W 72/121 |
| | | | 370/252 |
| 2014/0045510 A1* | 2/2014 | Yue | H04W 72/042 |
| | | | 455/450 |
| 2014/0169275 A1* | 6/2014 | Nagata | H04W 16/14 |
| | | | 370/328 |

FOREIGN PATENT DOCUMENTS

| | | |
|---|---|---|
| CN | 102821476 A | 12/2012 |
| CN | 103024752 A | 4/2013 |
| WO | 2011150250 A1 | 12/2011 |

\* cited by examiner

SYSTEM AND METHOD FOR BOUNDARYLESS SERVICE IN WIRELESS NETWORKS WITH COOPERATIVE TRANSMISSION POINTS

TECHNICAL FIELD

The present invention relates generally to wireless technology, and, in particular embodiments, to a system and method for grouping and selecting transmission points in a wireless network.

BACKGROUND

Some network technologies that enable joint processing (JP) techniques have shown significant promise in improving throughput and coverage, as well as reducing operating expenses, such as for Third Generation Partnership (3GPP) Long Term Evolution Advanced (LTE-A) communications networks. Typically, a strong backhaul link between transmission points (TP) and a central coordinating unit (CCU) is needed to form a joint transmission point from multiple TPs in a cell and realize multi-transmit point functionality for instance. Providing efficient implementation of joint scheduling and/or joint transmission in also requires stringent inter-TP synchronization, as well as accurate channel knowledge of the user equipment (UE) operating in the cell. Meeting these requirements and/or constraints may become infeasible as the size of the cells increases. Furthermore, computational costs involved in joint scheduling UEs also increases dramatically with the large number of UEs inherent in large cells. There is a need for a scheme that improves grouping and selection of TPs to serve UEs.

SUMMARY OF THE INVENTION

In accordance with an embodiment, a method implemented by a network component for serving one or more user equipment (UEs) experiencing inter-transmission point group (TPG) interference includes selecting a set of transmission points (TPs) from multiple TPGs in a network to serve an edge UE (EU) experiencing inter-TPG interference at a plurality of resource units (RUs). The set of TPs is selected according to a metric associated with the EU including a channel condition of the EU. The method further includes grouping the selected TPs into a TPG patch (TPGP) for at least one of the RUs, and performing transmission coordination for the EU between the TPs of the TPGP and other terminals of the network.

In accordance with another embodiment, a method implemented by a network component for serving one or more UEs experiencing inter-TPG interference includes selecting a set of TPs from multiple TPGs in a network to serve an EU experiencing inter-TPG interference at a plurality of RUs. The set of TPs is selected according to a metric associated with the EU including a channel condition of the EU. The method further includes implementing inter-TPG cooperation for transmission between the selected TPs for at least one of the RUs while maintaining required quality of service (QoS) for other terminals.

In accordance with another embodiment, a network component for serving one or more UEs experiencing inter-TPG interference includes a processor and a computer readable storage medium storing programming for execution by the processor. The programming includes instructions to select a set of TPs from multiple TPGs in a network to serve an EU experiencing inter-TPG interference at a plurality of RUs. The set of TPs is selected according to a metric associated with the EU including a channel condition of the EU. The network component is further configured to group the selected TPs into a TPGP for at least one of the RUs, and perform transmission coordination for the EU between the TPs of the TPGP and other terminals of the network.

In accordance with yet another embodiment, a network component for serving one or more UEs experiencing inter-TPG interference includes a processor and a computer readable storage medium storing programming for execution by the processor. The programming includes instructions to select a set of TPs from multiple TPGs in a network to serve an EU experiencing inter-TPG interference at a plurality of RUs. The set of TPs is selected according to a metric associated with the EU including a channel condition of the EU. The programming includes further instructions to implement inter-TPG cooperation for transmission between the TPs for at least one of the RUs while maintaining required QoS for other terminals.

The foregoing has outlined rather broadly the features of an embodiment of the present invention in order that the detailed description of the invention that follows may be better understood. Additional features and advantages of embodiments of the invention will be described hereinafter, which form the subject of the claims of the invention. It should be appreciated by those skilled in the art that the conception and specific embodiments disclosed may be readily utilized as a basis for modifying or designing other structures or processes for carrying out the same purposes of the present invention. It should also be realized by those skilled in the art that such equivalent constructions do not depart from the spirit and scope of the invention as set forth in the appended claims.

BRIEF DESCRIPTION OF THE DRAWINGS

For a more complete understanding of the present invention, and the advantages thereof, reference is now made to the following descriptions taken in conjunction with the accompanying drawing, in which.

Corresponding numerals and symbols in the different figures generally refer to corresponding parts unless other-

DETAILED DESCRIPTION OF ILLUSTRATIVE EMBODIMENTS

Figure 1:
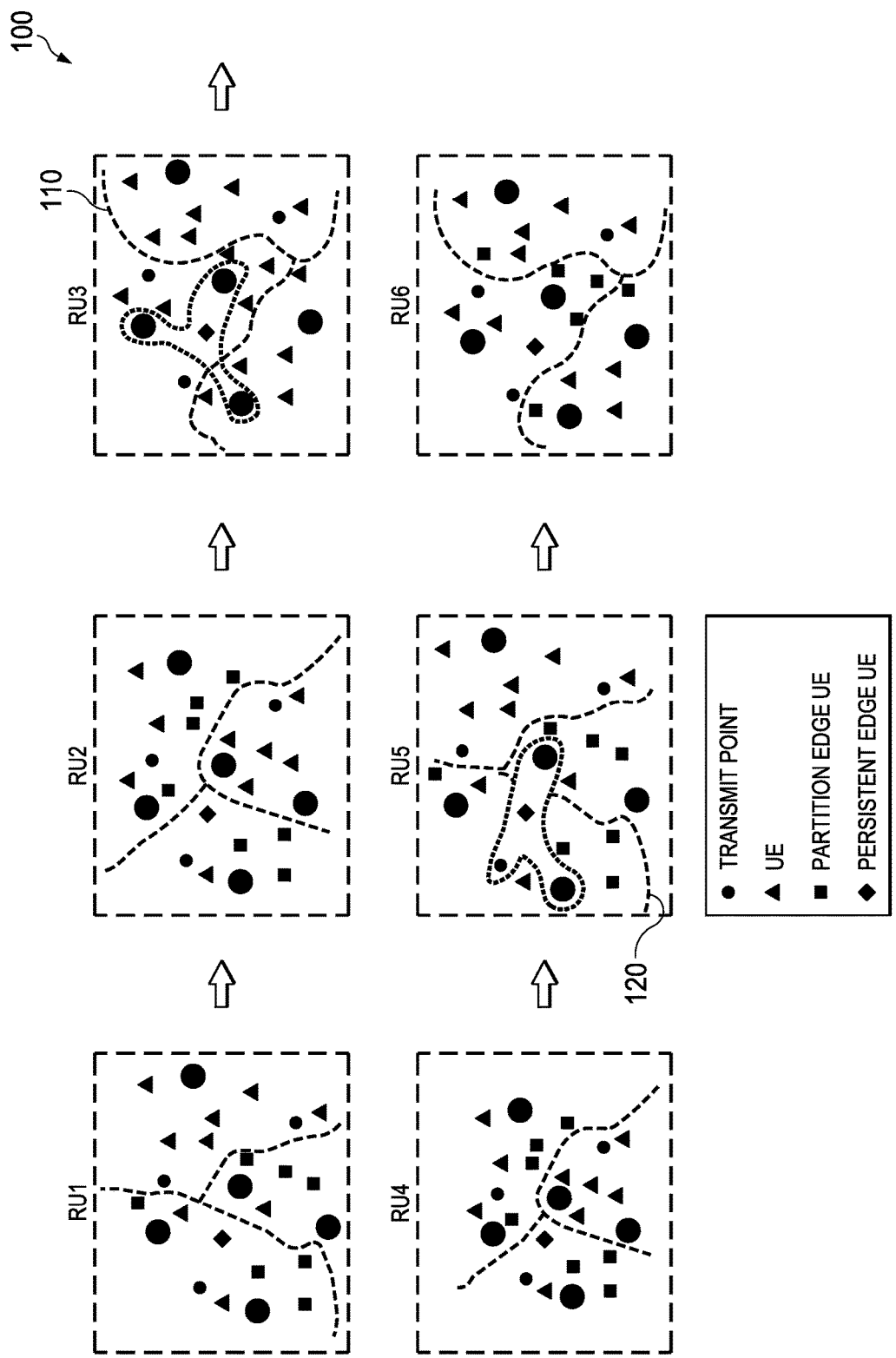
FIG. 1 illustrates an embodiment scheme for using a transmission point group (TPG) patch to serve persistent edge UEs.

It should be understood at the outset that although an illustrative implementation of one or more embodiments are provided below, the disclosed systems and/or methods may be implemented using any number of techniques, whether currently known or in existence. The disclosure should in no way be limited to the illustrative implementations, drawings, and techniques illustrated below, including the exemplary designs and implementations illustrated and described herein, but may be modified within the scope of the appended claims along with their full scope of equivalents.

In some wireless technologies, the network can be partitioned into a set of transmission point groups (TPGs) or a TPG set. The terms TGP set and overlay are used herein interchangeably to refer to a set of TGPs. Each TPG comprises one or more TPs (a group of TPs) for serving one or more UEs within a range of the TPs. The serving TPs are optimized to serve the UEs in the same partition, for example to control transmission power and reduce signal interference or to perform any of the schemes and embodiments below of coordinated multi-point (CoMP) transmission, such as Joint Transmission (JT), Coordinated beamforming (CB), coordinated beam switching (CBS), and other schemes. Multiple UEs may be assigned to a corresponding TPG for all allocated resource units (RUs) or resource blocks (RBs), e.g., using time and/or frequency division. As such, the same set of TPGs is configured for all RUs. Alternatively, different TPG sets can be established for different RUs, where some UEs may join different TPGs at different RUs. Further, metrics for UEs can be used to optimize or select the serving TPGs. In all such scenarios, some of the UEs may fall consistently or persistently at a boundary between different TPGs, and therefore may not be served efficiently. Such UEs may not have good signal quality communications, e.g., may experience high signal interference from multiple TPs of different TPGs. This can cause drop of service and unsatisfactory user experience. There is a need for a scheme that improves grouping and selection of TPs (in the TPGs) to handle or resolve the issue of having UEs persistently at edges between TPGs, and hence persistently experiencing inter-TPG interference.

Embodiments are provided to serve UEs that experience, e.g., persistently, inter-TPG interference in a TPG set in a wireless or cellular network. The embodiments include steps to serve edge UEs (EUs) such as persistent edge UEs (PEUs) using a set of TPs in one or more TPGs. The selected set of TPs used for serving the PEUs are dynamically determined based on UE-centric metrics. The metrics can involve both PEUs and surrounding UEs. The UE-centric metrics are used to partition the network to multiple TPG sets. In each RU, a TPG set that maximizes a network-wide utility (e.g., function, usefulness, effectiveness, and/or efficiency) can be used for scheduling transmissions for the RUs. In each RU, UEs are associate with the best TPG in the used TPG set.

Specifically, grouping and transmission schemes are used for serving the PEUs by providing boundaryless service, e.g., avoid the boundary situation for PEUs at least some at some RUs. The schemes can be based on the PEUs' and neighboring UEs' metrics, such as Reference Signal Receive Power (RSRP), instantaneous channel, TPG load, or other suitable metrics. The transmission schemes include forming a dedicated TPG patch, joint transmission from neighboring TPGs, and/or dynamic point selection. Coordinated Multi-Point (CoMP) transmission and/or interference coordination may also be used between neighboring TPGs. The different approaches are described in detail below. The schemes improve network-wide performance gain and flexibility for using TP cooperation technology.

In one scheme, a TPG patch (TPGP) is used to serve PEUs. At each RU, the best or optimal TPG set may be selected based on network-wide metrics. UE-based metrics may then be used to borrow TPs from neighboring TPGs to form a TPG patch (TPGP) for serving one or more PEUs. Service to PEU can be in the form of joint transmission, dynamic point selection, or other suitable techniques. Cooperation between the TPGP and neighboring TPGs may also be included, such as in the form of interference coordination. In another scheme, inter-TPG cooperation (cooperation between neighboring TPGs) is used to serve PEUs. This includes joint transmission techniques from neighboring TPGs to a PEU or interference avoidance to the PEU, Interference avoidance may include power reduction (or shutting down) among the dominant interfering TPs from neighboring TPGs.

The schemes above may be implemented using communications between TPs (e.g., at different TPGs) and/or a central coordinator unit (CCU) or (e.g., a dedicated network component or node) to determine TPG sets for RUs and select the best or suitable TGP set for each RU. Communications between the TPs and the CCU may be exchanged through backhaul connections between such components. The TPs and/or CCU can also determine a TPGP, e.g., for each or some RUs. The used transmission scheme within each TPG can be implemented in a distributed manner in each selected TPG or using the CCU control.

FIG. 1 shows an embodiment scheme 100 for using a TPGP to serve PEUs. The scheme 100 determines TPG sets for a plurality of RUs (RU1, RU2, RU3, RU4, RU5, RU6). Each RU is assigned a suitable TPG set comprising a plurality of TPGs that serve a plurality of users. Some of the RUs may be assigned similar or same TPG sets (with same TPs). For example, similar TPG sets are used for RU1 and RU5, for RU2 and RU4, and for RU3 and RU6. The users include UEs that receive sufficiently good service (good signal quality) from one or more corresponding TPs in corresponding TPGs. The users may also include partition edge UE(s) that are close to boundaries between TPGs with lower quality signals (due to interference). The users also include PEUs. The partition edge UEs change at different RUs due to the different TPG sets. Therefore such UEs may at least some of the time become UEs with sufficient or good signal quality. However, the PEUs fall consistently at the edges or boundaries of TPGs at all TGP sets or RUs, and hence persistently experiencing inter-TPG interference.

To ensure that such PEUs are served with suitable or good signal quality at least at some RUs (e.g., at least for some time/frequency allocation), a TPGP is also configured and assigned at one or more RUs (such as RU3 and RU5). The TPGP may include TPs from two or more TPGs to ensure good signal quality at the boundary or edge where one or more PEUs are located. As described above, the TPGP is formed using UE-based metrics. The TPs that form the TPGP (form multiple TPGs) service the PEU with joint transmission, dynamic point selection, or other techniques. The TPs in the TPGP may also cooperate with TPs in neighboring TPGs for this purpose, such as in the form of interference coordination.

Figure 2:
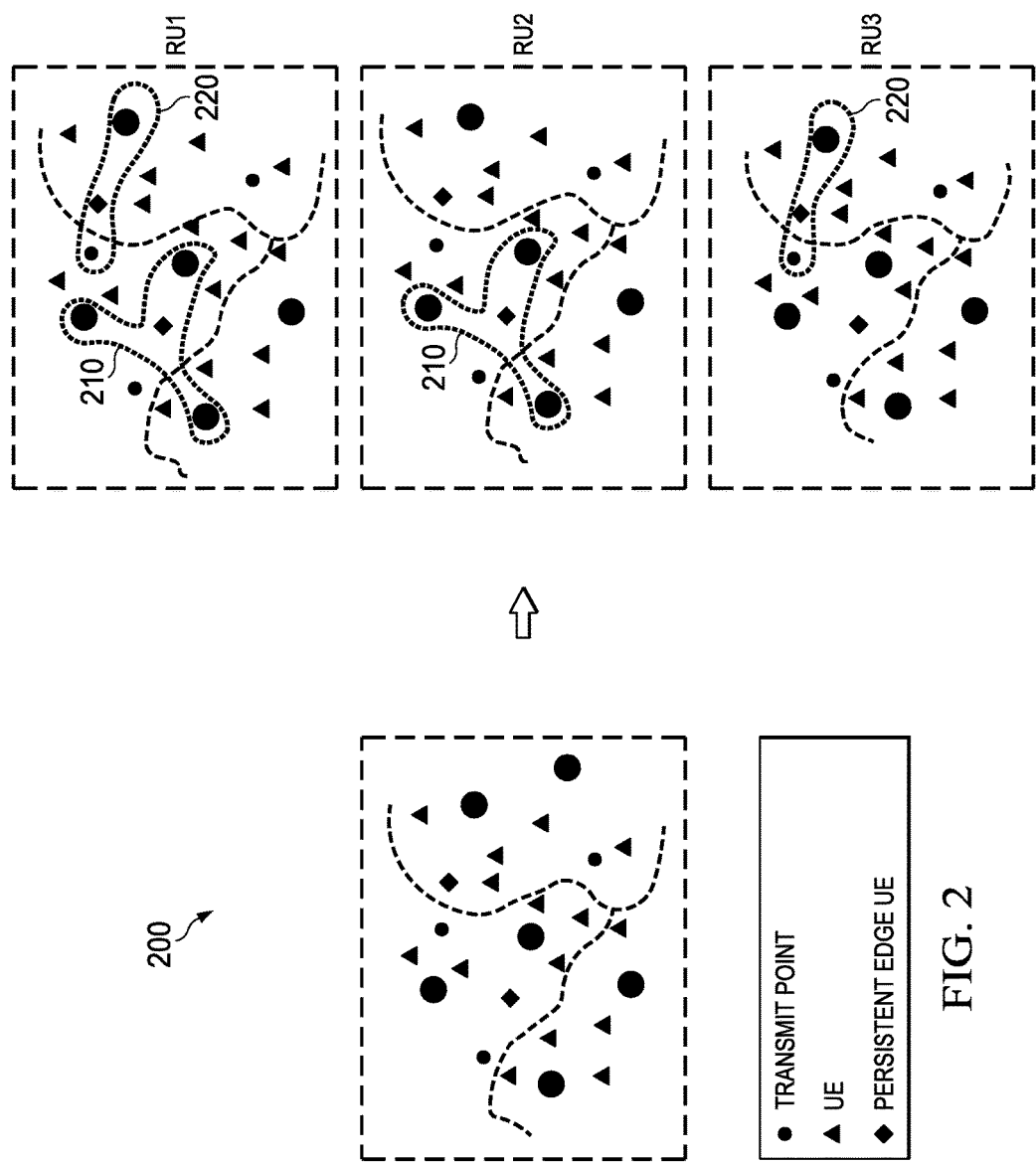
FIG. 2 illustrates another embodiment scheme for using a TPG patch to serve persistent edge UEs.

FIG. 2 shows another embodiment scheme 200 for using a TPGP to serve PEUs. The same TPG set in all shown RUs (RU1, RU2, RU3) comprises a plurality of TPGs (same TPGs) that serve a plurality of users. The users include UEs that receive sufficiently good service (good signal quality) from one or more corresponding TPs in corresponding TPGs. The users also include PEUs. The scheme 200 determines a TPG set with one or more TPGPs for a plurality of RUs. For example, two TPGPs (TPGP 210 and TPGP 220) are formed at RU1, one TPGP (TPGP 210) is formed at RU2, and one TPGP (TPGP 220) is formed at RU3. Some of the RUs may be assigned similar or same TPGPs (with same TPs). For example, both RU1 and RU2 are assigned TPGP 210, and both RU3 and RU1 are assigned TPGP 220.

Figure 3:
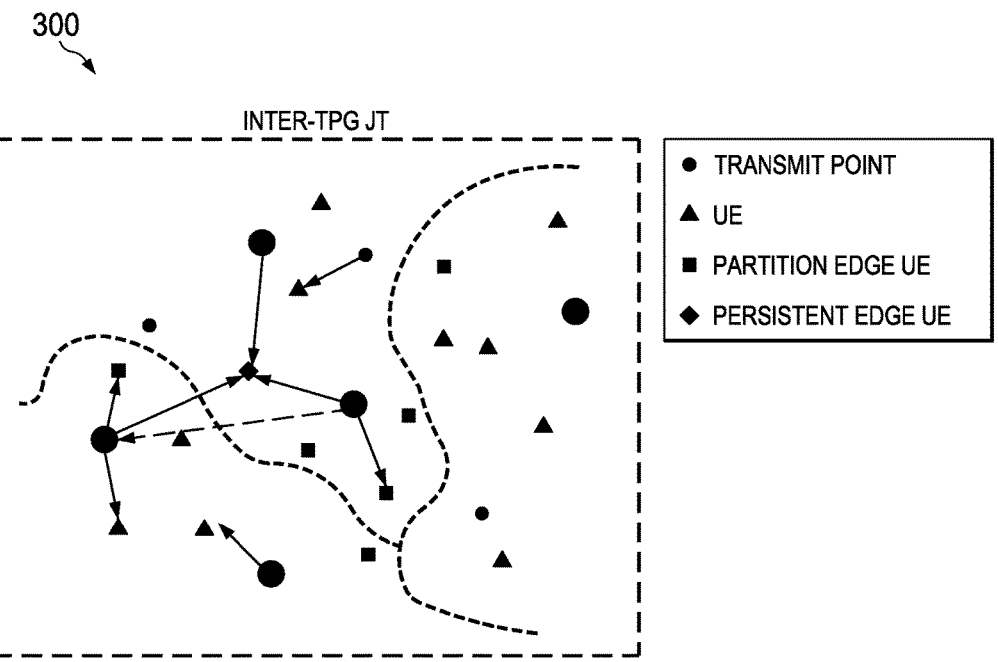
FIG. 3 illustrates an embodiment scheme for using inter-TPG cooperation in the form of joint transmission to serve persistent edge UEs.

FIG. 3 shows an embodiment scheme 300 for using inter-TPG cooperation to serve PEUs. In one scheme of the inter-TPG cooperation scheme 300, a PEU in a TPG is scheduled for receiving data with one or more TPs of the same TPG, similar to the remaining UEs and partition edge UEs of the TPG. The data transmitted from TPs to corresponding scheduled users are shown in solid line arrows in FIG. 3. The data transmitted by a TP to a PEU of the same TPG is further transmitted to one or more neighboring TPs in a neighboring or bordering TPG. This is shown by a dashed line arrow in Figured 3. Specifically, the data for the PEU may be sent from one or more TPs to a dominant interfering TP at the bordering TPG. The neighboring TP(s) receiving the data for the PEU then perform(s), using the data, joint transmission with the TP(s) serving the PEU. This can improve the signal quality and reduce signal interference for each considered PEU. In another scheme, the PEU data can be first sent from the TP(s) serving the PEU in a TPG to a neighboring (dominant interfering) TP. Subsequently, the serving TP(s) and dominant interfering TP combined schedule transmission to the PEU and use inter-TPG joint transmission for the PEU. Either schemes can be used for each considered PEU. The scheme 300 may be an alternative scheme to schemes 100 and 200, which is implemented without selecting and optimizing a patch of TPGs.

Figure 4:
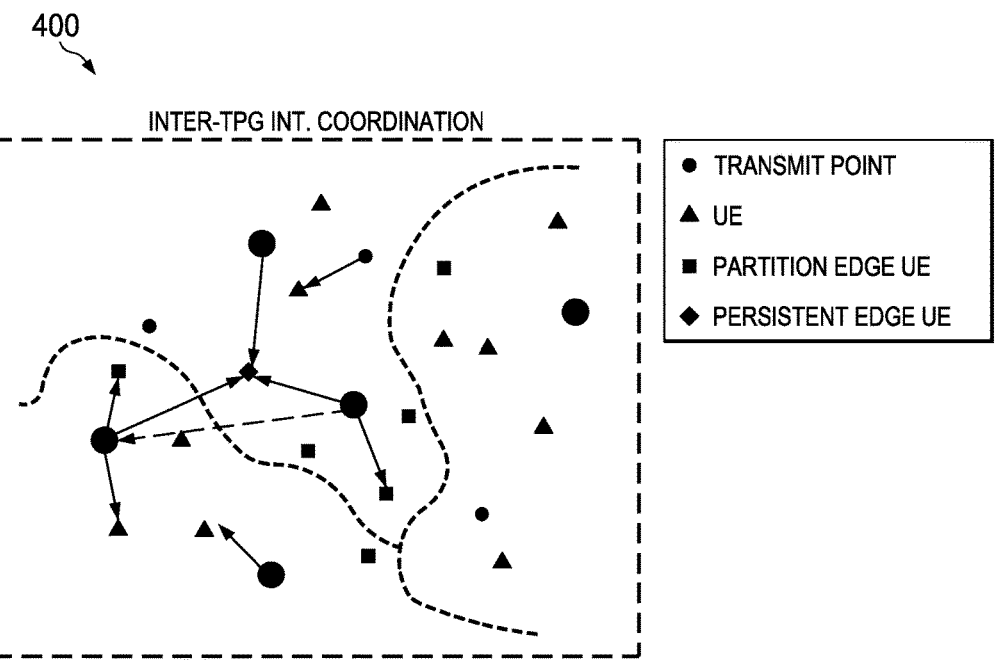
FIG. 4 illustrates an embodiment scheme for using inter-TPG cooperation in the form of interference coordination to serve persistent edge UEs.

FIG. 4 shows an embodiment scheme 400 for using inter-TPG joint transmission and interference coordination to serve PEUs. In the inter-TPG joint transmission and interference coordination, a PEU in a TPG is scheduled for receiving data with one or more optimized TPs of the same TPG, e.g., similar to the remaining UEs and partition edge UEs of the TPG. The data transmitted from TPs to corresponding scheduled users are shown in solid line arrows in FIG. 4. The serving TP(s) also communicate or signal one or more neighboring TPs in a neighboring or bordering TPG to perform coordinated beam-forming and/or power reduction (or shutting down) of the one or more neighboring TPs. This is shown by a dashed line arrow in Figured 4. Specifically, the signaling may be exchanged with a dominant interfering TP at the bordering TPG. This can improve the signal quality at the PEU by reducing the interference signal from the neighboring (dominant interfering) TP. The scheme can be used for each considered PEU. The scheme 400 may be an alternative scheme to schemes 100 and 200, which is implemented without selecting and optimizing a patch of TPGs.

Figure 5:
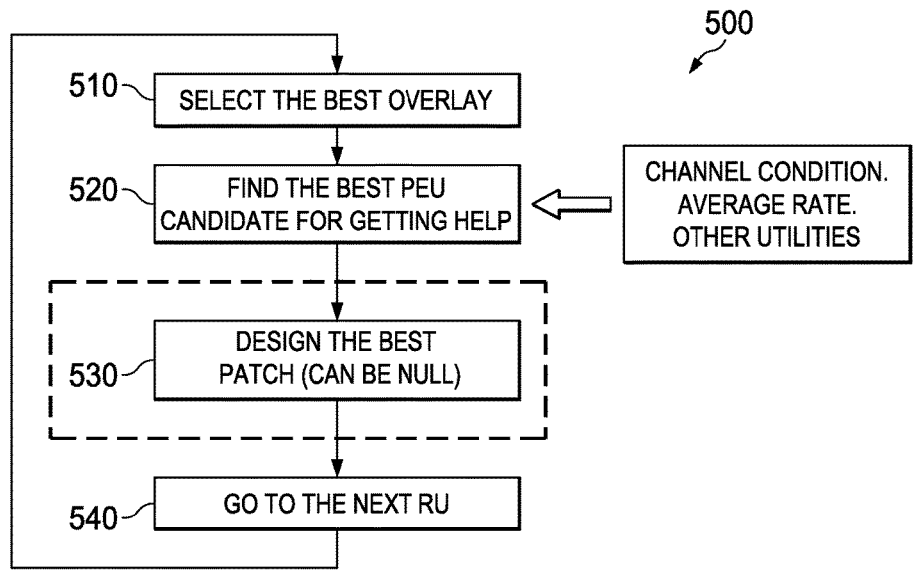
FIG. 5 illustrates a flowchart of an embodiment method for serving persistent edge UEs.

FIG. 5 shows an embodiment method 500 for serving PEU(s), specifically using the TPGP approach. The method 500 may be implemented by one or more TPs and/or the network (e.g., at a CCU). At step 510, a best overlay (TPG set) is selected and optimized for serving a plurality of UEs in a network. At step 520, the method 500 finds a best or suitable PEU (e.g., from a plurality of detected PEUs) for getting help. The PEU can be selected using UE related metrics, such as channel condition, average rate, and/or other utilities. At step 530, a best or optimal patch (TPGP) may be formed. The TPGP includes TPs from multiple (two or more) TPGs. The selected TPs are optimized for serving the PEU, e.g., in addition to the optimization for serving the UEs in the TPs' corresponding TPGs. In some cases, the TPGP may be a null set containing no TPs, such as at one or more RUs. The steps 510 to 530 may be implemented for each RU under consideration. At step 540, the method 500 moves to the next RU to implement the same steps 510 to 530.

Figure 6:
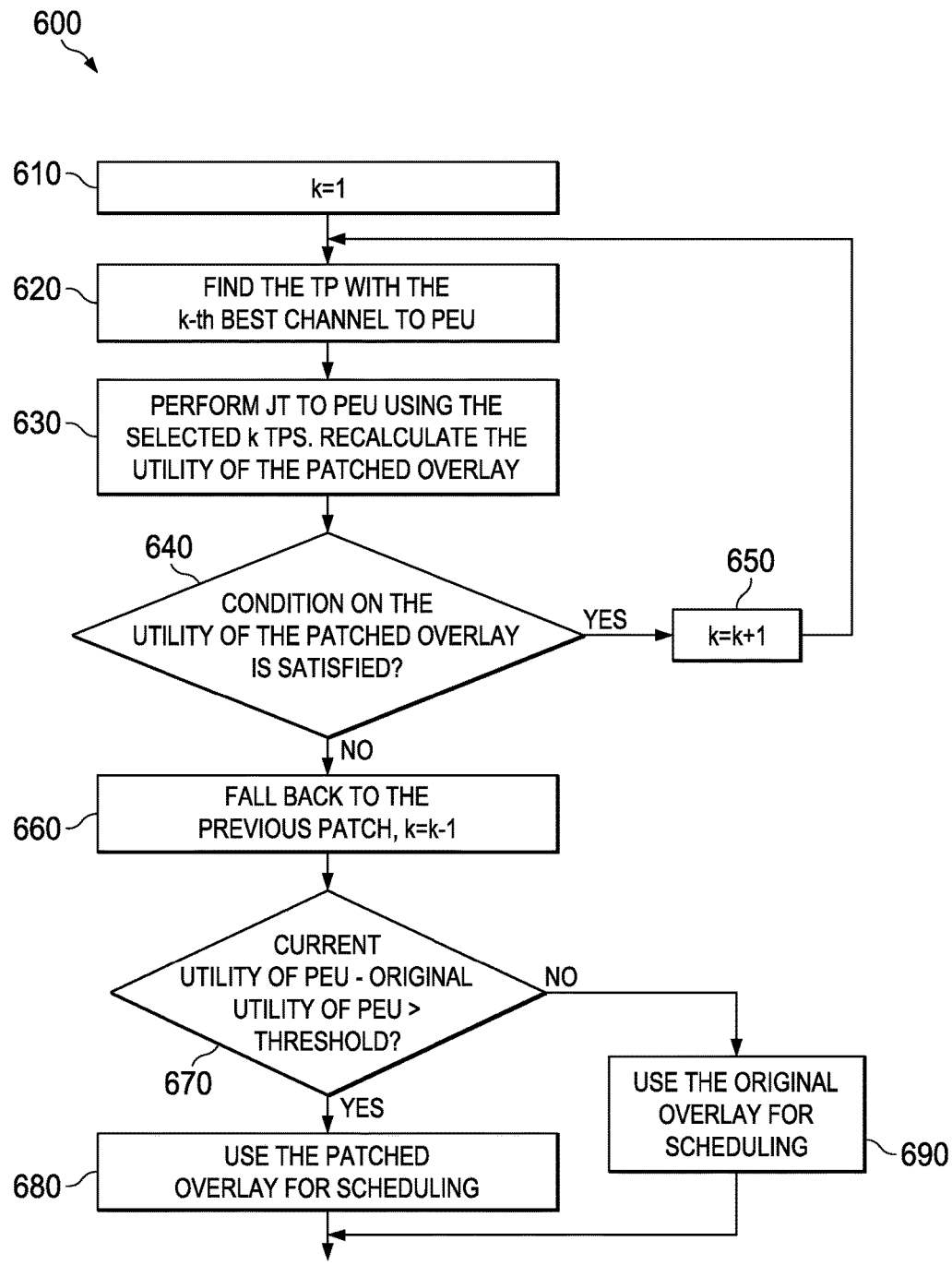
FIG. 6 illustrates a flowchart of another embodiment method for serving persistent edge UEs.

FIG. 6 shows an embodiment method 600 for forming a TPGP out of a TPG set to serve PEU(s). The method 600 may be implemented by one or more TPs and/or the network (e.g., at a CCU). At step 610, an enumerator or integer k is set to 1 to start considering a first TP to form a TPGP. At step 620, the method 600 finds the k-th TP (from a plurality of TPGs in a TPG set) with best channel conditions to a PEU under consideration. At step 630, joint transmission (JT), e.g., for the PEU under consideration, is performed using all selected k TPs. Accordingly, the utility (e.g., signal quality or performance level) of the patched overlay (TPG set) is recalculated considering the fact that k TPs from the TPG set are borrowed to make a TPGP to primarily serve the PEU under consideration. At decision step 640, the method 600 determines whether a condition on the utility of the patched overlay (for all UEs in the network other than the PEU) is still satisfied. For example, the condition may include meeting a minimum sum QoS, or sum weighted proportional fairness (PF) factor for all UEs other than the PEU under consideration. If the condition of step 640 is satisfied, then the method 600 continues to step 650, where the enumerator k is incremented by one to examine a next TP for the patch. After step 650, the method 600 returns to step 620. Otherwise, if the condition of step 640 is not satisfied, then the method 600 proceeds to step 660. At step 660, the method 600 falls back to the last formed patch excluding the last considered k-th TP. To remove the last considered TP, the enumerator k is decremented by one. Next, at decision step 670, the method 600 examines whether the difference between the current utility (e.g., signal quality) and the original utility of the PEU is greater than (or equal to) a predetermined threshold (e.g., a minimum acceptable value). If the condition of step 670 is satisfied, then the method 600 proceeds to step 680, where the resulting patched overlay (the original TPG set with the TPGP carved out of it to primarily serve the PEU under consideration) is used for scheduling the transmission for all UEs in the network other than the PEU while the TPGP is used to serve the PEU. Otherwise, the original overlay (TPG set) is used at step 690. The method 600 may proceed afterwards to step 610 to form a patch for another considered PEU.

Figure 7:
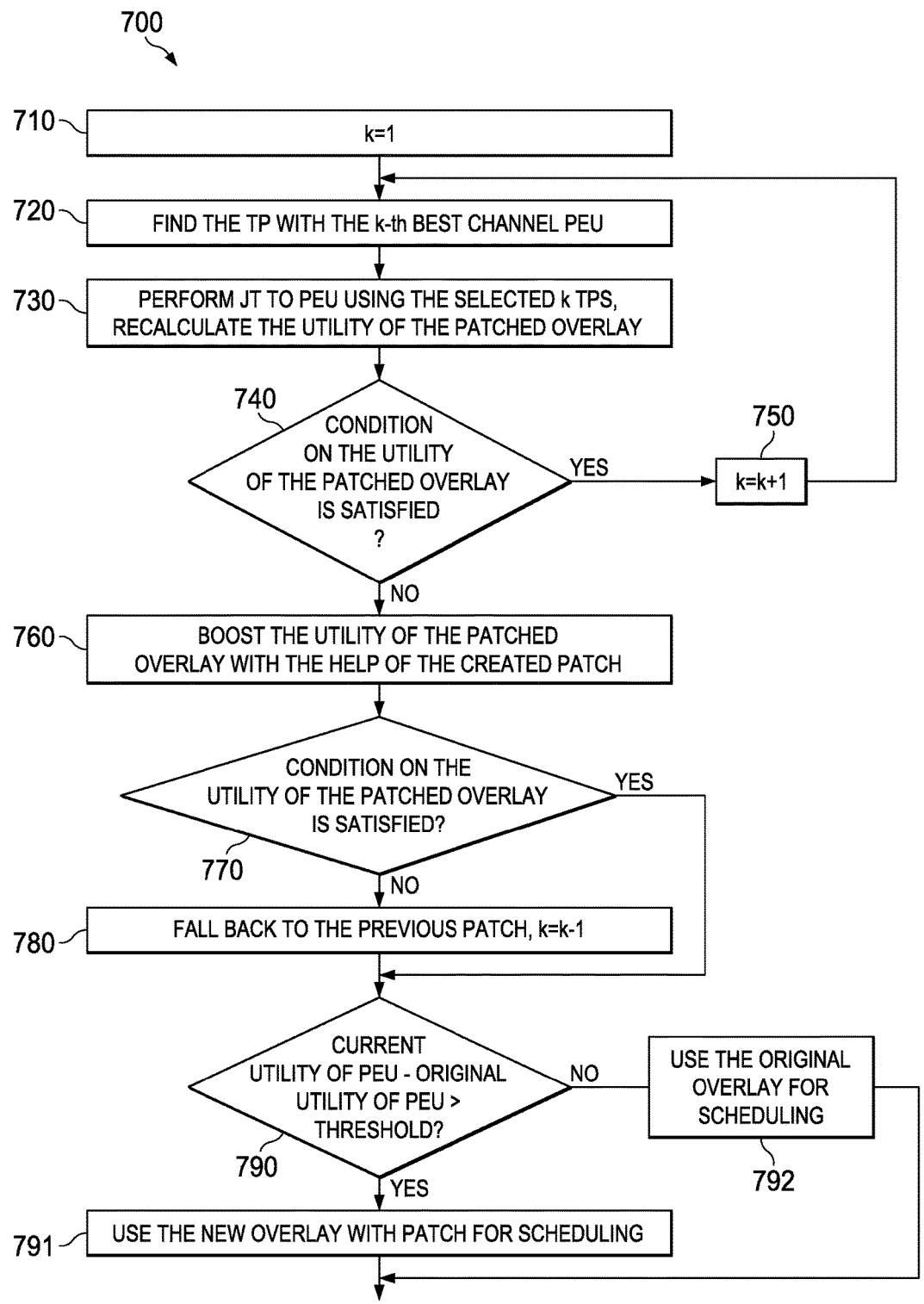
FIG. 7 illustrates a flowchart of another embodiment method for serving persistent edge UEs.

FIG. 7 shows another embodiment method 700 for forming a TPGP out of a TPG set to serve PEU(s). The method 700 may be implemented by one or more TPs and/or the network (e.g., at a CCU). The steps 710 to 750 are similar to the steps 610 to 650 (of method 600) respectively. At step 760, the utility for the patched overlay (TPG set excluding the created TPGP that is carved out of it to primarily serve the PEU) is boosted using the help of the created patch (TPGP). This can be achieved by schemes described further below. At decision step 770, the method 700 determines whether the condition on the utility of the patched overlay is satisfied. If the condition of step 770 is satisfied, then the method 700 proceeds to step 790. Otherwise, the method 700 proceeds to step 780, where the method 700 falls back to the last formed patch excluding the last considered k-th TP. To remove the last considered TP, the enumerator k is decremented by one. The method 700 proceeds then to decision step 790, where the method 700 examines whether the difference between the current utility and the original utility of the PEU is greater than (or equal to) a predetermined threshold. If the condition of step 790 is satisfied, then the method 700 proceeds to step 791, where the resulting patched overlay (the original TPG set with the TPGP carved out of it to primarily serve the PEU under consideration) is used to serve all UEs in the network other than the PEU under consideration while the TPGP is used to serve the PEU under consideration. Otherwise, the original overlay is used at step 792. The method 700 may proceed afterwards to step 710 to form a patch for another considered PEU.

Figure 8:
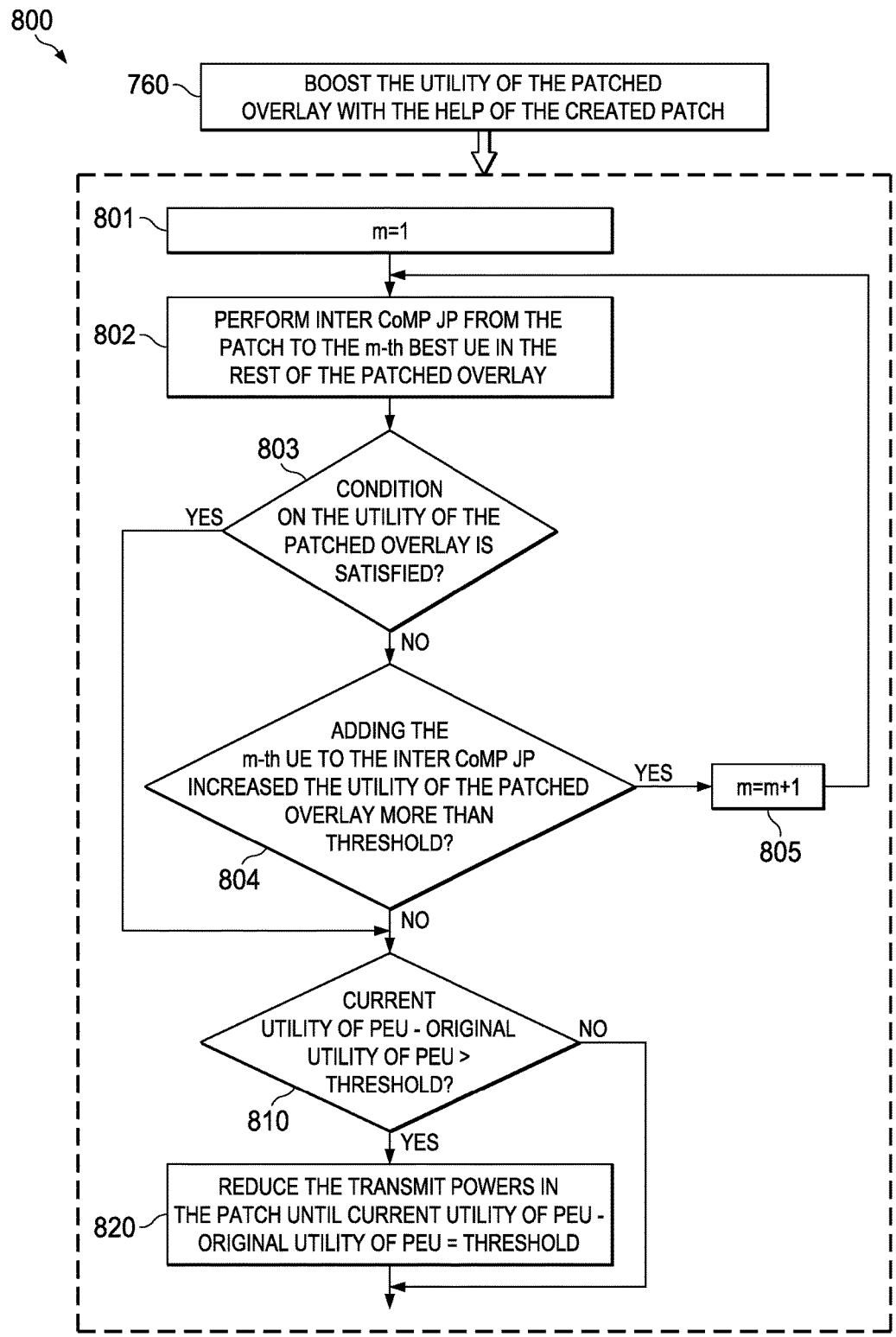
FIG. 8 illustrates a flowchart of another embodiment method for serving persistent edge UEs.

FIG. 8 shows another embodiment method 800 for using a TPGP to serve PEU(s). The method 800 comprises steps that can be implemented as part of step 760 of method 700 to boost the utility of the patched overlay with the help of the created patch. In one embodiment, the method 800 includes step 810 that determines whether the difference between the current utility and the original utility of the PEU is greater than (or equal to) a predetermined threshold. If the condition of step 810 is satisfied, then the method 800 proceeds to step 820, where the transmit power in the patch is reduced until the difference between the current utility and the original utility of the PEU is equal to the threshold. Otherwise, no further action is taken by the method 800.

In another embodiment, the method 800 includes step 801 where an enumerator or integer m is set to 1 to start considering a first UE in the patched overlay (the original TPG set excluding the TPGP) for a CoMP transmission scheme that boosts the utility of the patched overlay. Next, at step 802, the method 800 performs inter CoMP joint transmission from the patch to the m-th best UE in the patched overlay. At decision step 803, the method 800 determines whether the condition on the utility of the patched overlay is satisfied. If the condition of step 803 is satisfied, then no further action is taken by the method 800. Otherwise, the method 800 proceeds to decision step 804 that determines whether adding the m-th UE to inter CoMP joint transmission increases the utility of the patched overlay more than a threshold. If the condition of step 804 is satisfied, then the method 800 proceeds to step 805, where the enumerator m is incremented by one to examine a next UE for the CoMP transmission scheme. After step 805, the method 800 returns to step 801. Otherwise, if the condition of step 804 is not satisfied, then no further action is taken by the method 800.

Figure 9:
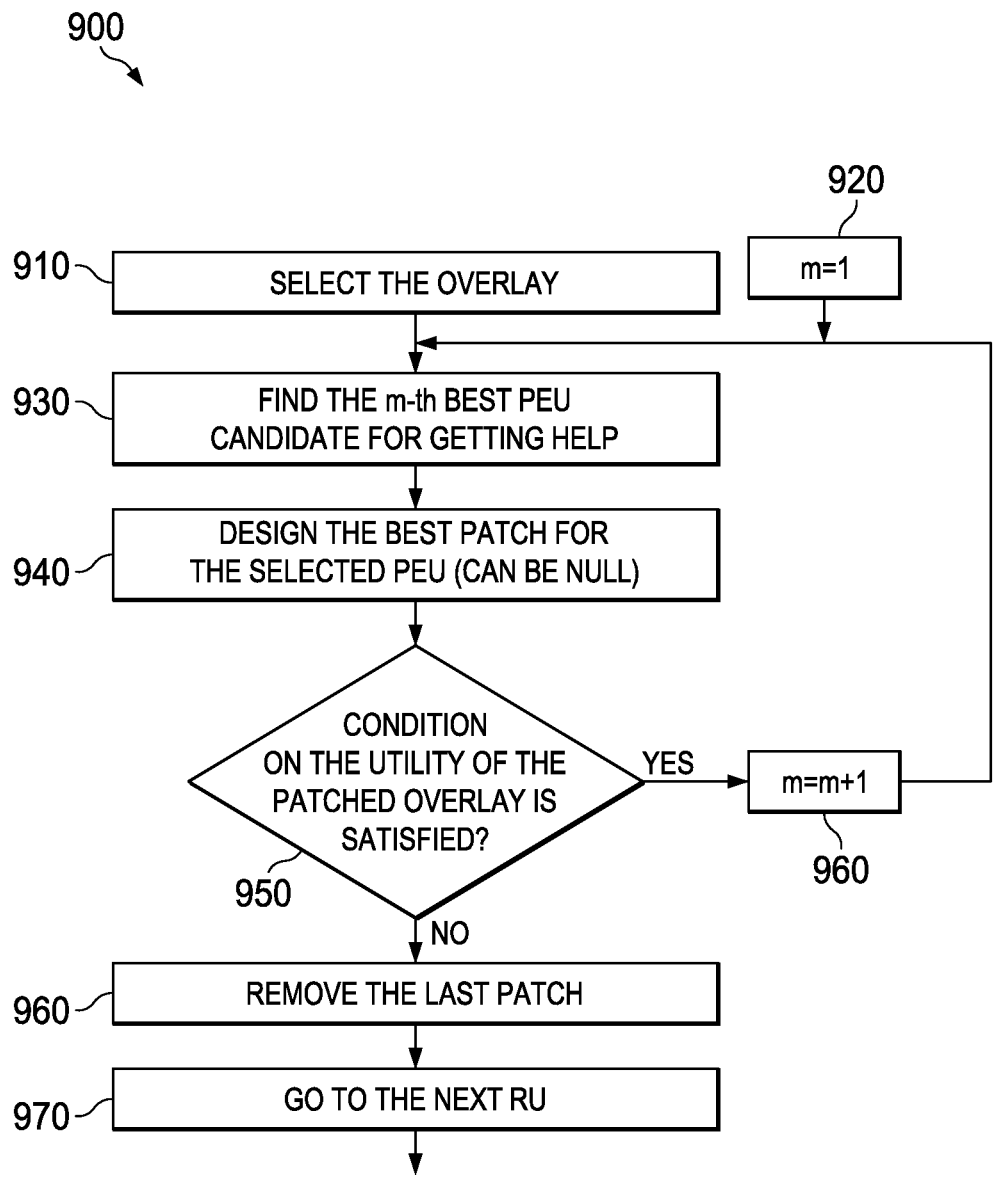
FIG. 9 illustrates a flowchart of another embodiment method for serving persistent edge UEs.

FIG. 9 shows another embodiment method 900 for using a TPGP to serve PEU(s). The method 900 may be implemented by one or more TPs and/or the network (e.g., at a CCU). At step 910, the method 900 selects the best overlay (TPG set). At step 920, an enumerator or integer m is set to 1 to start considering a first PEU to be served by the patch of TPs (a TPGP). At step 930, the method 900 finds the m-th best PEU candidate for getting help. At step 940, the method 900 configures or selects the best patch (by selecting and optimizing suitable TPs) for the selected PEU. The patch may be a null patch (empty patch), e.g., for one or more RUs. The best patch may be established using any combination of steps in the methods above. At decision step 950, the method 900 determines whether the condition on the utility of the patched overlay (the original TPG set excluding the patch) is satisfied. If the condition of step 950 is satisfied, then the method proceeds to step 960, where the enumerator m is incremented by one to examine a next PEU for the patch. After step 960, the method 900 returns to step 930. Otherwise, if the condition of step 950 is not satisfied, then the method 900 proceeds to step 960. At step 960, the method 900 removes the last designed patch. Next, at step 970, the method 970 proceeds to a next RU, where the same steps above may be repeated.

In different embodiment, any suitable combinations of steps in the methods and schemes above may be used to guaranty satisfactory signal quality or strength for one or more PEUs in a network while keeping the utility of the UEs in the rest of the network above a required level at one or more RUs. For instance, the combinations may include adding one or more TPs in a patch to serve one or more PEUs at one or more RUs. The combinations may also include incorporating CoMP transmission and/or other joint transmission or cooperation schemes between TPs (such as coordination, beam-forming, power or interference reduction), as described above.

Figure 10:
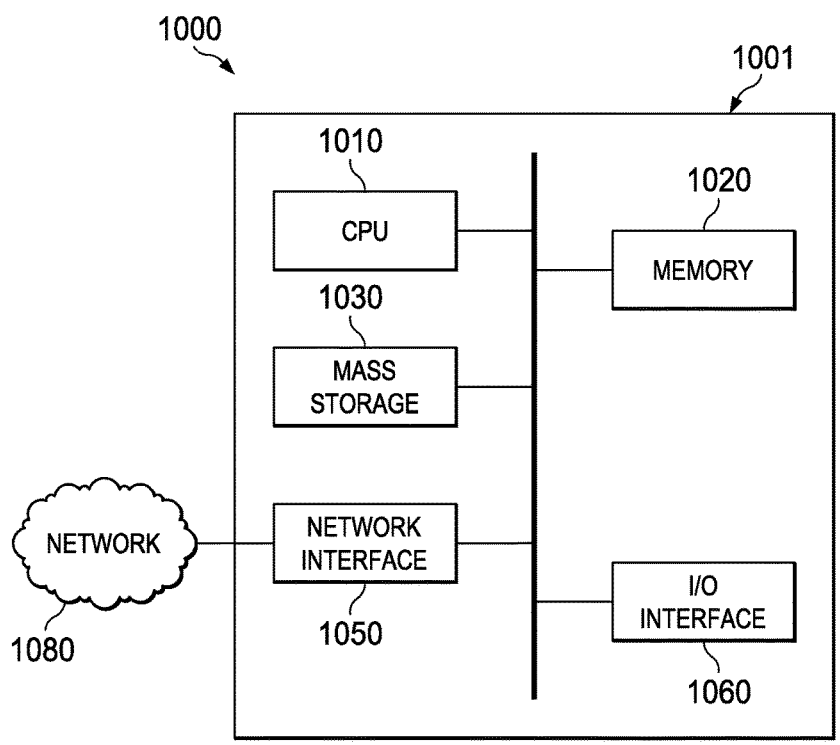
FIG. 10 is a diagram of a processing system that can be used to implement various embodiments.

FIG. 10 is a block diagram of an exemplary processing system 1000 that can be used to implement various embodiments. Specific devices may utilize all of the components shown, or only a subset of the components and levels of integration may vary from device to device. Furthermore, a device may contain multiple instances of a component, such as multiple processing units, processors, memories, transmitters, receivers, etc. The processing system 1000 may comprise a processing unit 1001 equipped with one or more input/output devices, such as a network interfaces, storage interfaces, and the like. The processing unit 1001 may include a central processing unit (CPU) 1010, a memory 1020, a mass storage device 1030, and an I/O interface 1060 connected to a bus. The bus may be one or more of any type of several bus architectures including a memory bus or memory controller, a peripheral bus or the like.

The CPU 1010 may comprise any type of electronic data processor. The memory 1020 may comprise any type of system memory such as static random access memory (SRAM), dynamic random access memory (DRAM), synchronous DRAM (SDRAM), read-only memory (ROM), a combination thereof, or the like. In an embodiment, the memory 1020 may include ROM for use at boot-up, and DRAM for program and data storage for use while executing programs. In embodiments, the memory 1020 is non-transitory. The mass storage device 1030 may comprise any type of storage device configured to store data, programs, and other information and to make the data, programs, and other information accessible via the bus. The mass storage device 1030 may comprise, for example, one or more of a solid state drive, hard disk drive, a magnetic disk drive, an optical disk drive, or the like.

The processing unit 1001 also includes one or more network interfaces 1050, which may comprise wired links, such as an Ethernet cable or the like, and/or wireless links to access nodes or one or more networks 1080. The network interface 1050 allows the processing unit 1001 to communicate with remote units via the networks 1080. For example, the network interface 1050 may provide wireless communication via one or more transmitters/transmit antennas and one or more receivers/receive antennas. In an embodiment, the processing unit 1001 is coupled to a local-area network or a wide-area network for data processing and communications with remote devices, such as other processing units, the Internet, remote storage facilities, or the like.

While several embodiments have been provided in the present disclosure, it should be understood that the disclosed systems and methods might be embodied in many other specific forms without departing from the spirit or scope of the present disclosure. The present examples are to be considered as illustrative and not restrictive, and the intention is not to be limited to the details given herein. For example, the various elements or components may be combined or integrated in another system or certain features may be omitted, or not implemented.

In addition, techniques, systems, subsystems, and methods described and illustrated in the various embodiments as discrete or separate may be combined or integrated with other systems, modules, techniques, or methods without departing from the scope of the present disclosure. Other items shown or discussed as coupled or directly coupled or communicating with each other may be indirectly coupled or communicating through some interface, device, or intermediate component whether electrically, mechanically, or otherwise. Other examples of changes, substitutions, and alterations are ascertainable by one skilled in the art and could be made without departing from the spirit and scope disclosed herein.

What is claimed is:

1. A method performed by a network component for serving one or more user equipment (UEs) experiencing inter-transmission point group (TPG) interference in a wireless network, the method comprising:
    selecting a set of transmission points (TPs) from a plurality of TPGs in a network to serve an edge UE (EU) experiencing inter-TPG interference at a plurality of resource units (RUs), the plurality of TPGs comprising a first TPG and a second TPG, wherein the EU experiences inter-TPG interference from the first TPG at a first RU and experiences inter-TPG interference from the second TPG at a second RU, and wherein the set of TPs is selected according to a metric associated with the EU including a channel condition of the EU;
    grouping the selected set of TPs into a first TPG patch (TPGP) for the first RU and a second TPGP for the second RU, the first TPGP comprising one or more TPs of the first TPG, and the second TPGP comprising one or more TPs of the second TPG; and
    performing transmission coordination for the EU between the one or more TPs of the first TPGP and other terminals of the network at the first RU and transmission coordination for the EU between the one or more TPs of the second TPGP and other terminals of the network at the second RU.

2. The method of claim 1, wherein performing transmission coordination for the EU between the one or more TPs of the first TPGP and the other terminals of the network includes performing interference coordination between the one or more TPs of the first TPGP and the other terminals of the network.

3. The method of claim 1, wherein performing transmission coordination for the EU between the one or more TPs of the first TPGP and the other terminals of the network includes performing Coordinated Multi-Point (CoMP) transmission between the one or more TPs of the first TPGP and the other terminals of the network.

4. The method of claim 1, wherein at least one of the selected set of TPs of the first TPGP further serves at least one other UE allocated in a TPG outside the first TPGP.

5. The method of claim 1, wherein the metric includes at least one of Reference Signal Receive Power (RSRP) information, average rate information, instantaneous channel information, and TPG load information.

6. The method of claim 1, wherein the metric further includes a channel condition for a UE neighboring the EU.

7. The method of claim 1, further comprising:
    selecting a second set of TPs from the plurality of TPGs to serve a second EU experiencing inter-TPG interference at the plurality of RUs, the second set of TPs selected according to a metric associated with the second EU including a channel condition of the second EU;
    grouping the second set of TPs into a second TPGP for at least one of the plurality of RUs; and
    performing transmission coordination for the second EU between the one or more TPs of the second TPGP and the other terminals of the network.

8. The method of claim 7, wherein the grouping of the second set of TPs into the second TPGP is for at least one RU of the first TPGP.

9. The method of claim 7, wherein the grouping of the second set of TPs into the second TPGP is for at least one RU different from at least one RU of the first TPGP.

10. The method for claim 1, further comprising:
    for each of the plurality of RUs, determining TPGs for serving a plurality of UEs in the network;
    selecting, from the UEs, the EU better suitable for receiving service help; and
    grouping the TPs into a corresponding TPGP for the selected EU, or allocating for the selected EU a null TPGP comprising no TPs.

11. The method of claim 1, wherein the EU is a persistent edge EU.

12. A method performed by a network component for serving one or more user equipment (UEs) experiencing inter-transmission point group (TPG) interference in a wireless network, the method comprising:
    selecting a set of TPs from a plurality of TPGs in a network to serve an edge UE (EU) experiencing inter-TPG interference at a plurality of resource units (RUs), the plurality of TPGs comprising a first TPG and a second TPG, wherein the EU experiences inter-TPG interference from the first TPG at a first RU and experiences inter-TPG interference from the second TPG at a second RU, and wherein the set of TPs is selected according to a metric associated with the EU including a channel condition of the EU, the selected set of TPS comprising TPs from the first TPG and TPs from the second TPG; and
    implementing inter-TPG cooperation for transmission between the TPs from the first TPG for the first RU and between the TPs from the second TPG for the second RU while maintaining required quality of service (QoS) for other terminals.

13. The method of claim 12, further comprising:
    scheduling transmission for the EU from at least one first TP in a first TPG serving the EU;
    exchanging transmission data with at least one second TP in a second TPG neighboring the first TPG; and
    implementing inter-TPG joint transmission to the EU from the first TP and the second TP.

14. The method of claim 13, further comprising reducing interference at the EU in accordance with the exchanged transmission data, wherein the second TP is a dominant interfering TP to the EU.

15. The method of claim 12, further comprising:
    exchanging transmission data with at least one second TP in a second TPG neighboring a first TPG serving the EU;
    scheduling transmission for the EU from at least one first TP in the first TPG and from the second TP in the second TPG; and implementing inter-TPG joint transmission to the EU from the first TP and the second TP.

16. The method of claim 12, further comprising:
scheduling transmission for the EU from at least one first TP in a first TPG serving the EU; and
performing coordinated beam-forming and power reduction with a dominant interfering TP in a second TPG neighboring the first TPG.

17. The method of claim 12, wherein the EU is a persistent edge EU.

18. A network component for serving one or more user equipment (UEs) experiencing inter-transmission point group (TPG) interference in a wireless network, the network component comprising:
a processor; and
a non-transitory computer readable storage medium storing programming for execution by the processor, the programming including instructions to:
select a set of TPs from a plurality of TPGs in a network to serve an edge UE (EU) experiencing inter-TPG interference at a plurality of resource units (RUs), the plurality of TPGs comprising a first TPG and a second TPG, wherein the EU experiences inter-TPG interference from the first TPG at a first RU and experiences inter-TPG interference from the second TPG at a second RU, and wherein the set of TPs is selected according to a metric associated with the EU including a channel condition of the EU;
group the selected set of TPs into a first TPG patch (TPGP) for the first RU and a second TPGP for the second RU, the first TPGP comprising one or more TPs of the first TPG, and the second TPGP comprising one or more TPs of the second TPG; and
perform transmission coordination for the EU between the one or more TPs of the first TPGP and other terminals of the network at the first RU and transmission coordination for the EU between the one or more TPs of the second TPGP and other terminals of the network at the second RU.

19. The network component of claim 18, wherein the instructions to perform transmission coordination for the EU between the one or more TPs of the first TPGP and the other terminals of the network includes further instructions to perform at least one of interference coordination and Coordinated Multi-Point (CoMP) transmission between the one or more TPs of the first TPGP and the other terminals of the network.

20. The network component of claim 18, wherein the metric includes at least one of Reference Signal Receive Power (RSRP) information, average rate information, instantaneous channel information, and TPG load information, and wherein the metric further includes a channel condition for at least one UE neighboring the EU.

21. The network component of claim 18, wherein the network component is one of the set of TPs or a central coordinating unit (CCU).

22. The network component of claim 18, wherein the EU is a persistent edge EU.

23. A network component for serving one or more user equipment (UEs) experiencing inter-transmission point group (TPG) interference in a wireless network, the network component comprising:
a processor; and
a non-transitory computer readable storage medium storing programming for execution by the processor, the programming including instructions to:
select a set of TPs from a plurality of TPGs in a network to serve an edge UE (EU) experiencing inter-TPG interference at a plurality of resource units (RUs), the plurality of TPGs comprising a first TPG and a second TPG, wherein the EU experiences inter-TPG interference from the first TPG at a first RU and experiences inter-TPG interference from the second TPG at a second RU, and wherein the set of TPs is selected according to a metric associated with the EU including a channel condition of the EU, the selected set of TPS comprising TPs from the first TPG and TPs from the second TPG; and
implement inter-TPG cooperation for transmission between the TPs from the first TPG for the first RU and between the TPs from the second TPG for the second RU while maintaining required quality of service (QoS) for other terminals.

24. The network component of claim 23, wherein the programming includes further instructions to perform inter-TPG joint transmission or coordinated beam-forming and power reduction between at least one first TP in a first TPG serving the EU and at least one second TP in a second TPG neighboring the first TPG, and wherein the EU is located in the first TPG at a boundary between the first TPG and the second TPG.

25. The network component of claim 23, wherein the EU is a persistent edge EU.

26. A method performed by a network component for serving one or more user equipment (UEs) experiencing inter-transmission point group (TPG) interference in a wireless network, the method comprising:
selecting a set of transmission points (TPs) from multiple TPGs in a network to serve an edge UE (EU) experiencing inter-TPG interference at a plurality of resource units (RUs), the set of TPs selected according to a metric associated with the EU including a channel condition of the EU;
grouping the selected set of TPs into a TPG patch (TPGP) for at least one of the plurality of RUs;
performing transmission coordination for the EU between the TPs of the TPGP and other terminals of the network;
for each of the TPs from the TPGs, considering for the TPGP a next TP with a better channel condition to the EU;
performing a joint transmission to the EU using all current considered TPs;
removing a last considered TP from the TPGP upon determining that the TPGP with all current considered TPs results in lowering network-wide utility to at least on UE outside the TPGP below an acceptable threshold; and
discarding the TPGP upon determining that an improvement in the channel condition of the EU under consideration using the TPGP is below a predetermined threshold.

27. The method of claim 26, further comprising reducing transmit power in the TPGP to match the improvement in a channel condition in the other terminals of the network to a predetermined threshold.

28. The method of claim 26, further comprising:
for each UE from a plurality of considered UEs, performing a Coordinated Multi-Point (CoMP) joint transmission from the TPGP to the UE; and
including the UE in the CoMP joint transmission upon detecting an improvement in the channel condition or discarding the UE otherwise.

29. The method of claim 26, further comprising for each EU from a plurality of considered EUs, adding the EU to a set of current EUs served by the TPGP upon determining that the TPGP and the other terminals of the network satisfy a predetermined channel condition or network-wide utility.

30. The method of claim 1, wherein a TP of the TPs remains part of the TPGs after selecting the set of TPs from the TPGs.

31. A method performed by a network component for serving one or more user equipment (UEs) experiencing inter-transmission point group (TPG) interference in a wireless network, the method comprising:

- selecting a set of transmission points (TPs) from a plurality of TPGs in a network to serve an edge UE (EU) experiencing inter-TPG interference at a plurality of resource units (RUs), the plurality of TPGs comprising a first TPG and a second TPG, wherein the EU experiences inter-TPG interference from the first TPG at a first RU and experiences inter-TPG interference from the second TPG at a second RU, and wherein the set of TPs is selected according to a metric associated with the EU including a channel condition of the EU;
- grouping the selected set of TPs into a TPG patch (TPGP) for at least one of the plurality of RUs, the TPGP comprising one or more TPs of the first TPG and one or more TPs of the second TPG; and
- performing transmission coordination for the EU between the TPs of the TPGP and other terminals of the network.

* * * * *